United States Patent
Führer et al.

(10) Patent No.: US 7,168,335 B2
(45) Date of Patent: Jan. 30, 2007

(54) INTERMEDIATE GEAR SYSTEM FOR THE REVERSE GEAR OF A GEARBOX WITH POWER TAKE-OFF

(75) Inventors: Gerhard Führer, Friedrichshafen (DE); Hermann Lanz, Frickingen (DE); Gerhard Höring, Hagnau (DE); Roland Stauber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 190 days.

(21) Appl. No.: 10/522,354

(22) PCT Filed: Jul. 26, 2003

(86) PCT No.: PCT/EP03/08274

§ 371 (c)(1),
(2), (4) Date: Jan. 26, 2005

(87) PCT Pub. No.: WO2004/015303

PCT Pub. Date: Feb. 19, 2004

(65) Prior Publication Data

US 2005/0284244 A1    Dec. 29, 2005

(30) Foreign Application Priority Data

Aug. 3, 2002  (DE) ............................... 102 35 535

(51) Int. Cl.
*F16H 3/091* (2006.01)
(52) U.S. Cl. ........................ 74/329; 74/15.63
(58) Field of Classification Search ............. 74/329, 74/15.4, 15.66, 15.63, 11, 15.2, 15.6, 15.88, 74/15.69
See application file for complete search history.

(56) References Cited

U.S. PATENT DOCUMENTS 2,014,905 A    9/1935  Martinuzzi (Continued)

FOREIGN PATENT DOCUMENTS

AT            194720          1/1958

(Continued)

OTHER PUBLICATIONS

Looman, Gear Transmission, 3rd Edition, Springer Publishing Company, p. 263.

(Continued)

*Primary Examiner*—Roger Pang
*Assistant Examiner*—Edwin A. Young
(74) *Attorney, Agent, or Firm*—Davis & Bujold, P.L.L.C.

(57) ABSTRACT

An arrangement of the intermediate gear for a reverse gear (1) is proposed for a transmission with a drive shaft and an output shaft (2) arranged coaxially in relation to it and with one additional intermediate shaft (4) arranged parallel to the drive and output shafts (2) for a power take-off. The intermediate gear for the reverse gear (1) is driven by a shaft (3) and drives the output shaft (2), in which the intermediate gear for the reverse gear (1) is arranged above an imaginary plane (A) extended through the axes of the driving shaft (3) and the output shaft (2) and, with a horizontal orientation of plane (A), the driving shaft (3) is located to the right of the output shaft (2) in the direction of travel.

2 Claims, 1 Drawing Sheet

U.S. PATENT DOCUMENTS

| | | | |
|---|---|---|---|
| 4,435,994 A | | 3/1984 | Hata et al. |
| 4,463,621 A | * | 8/1984 | Fisher ......................... 74/330 |
| 4,495,838 A | * | 1/1985 | Gooch ......................... 477/116 |
| 6,092,432 A | * | 7/2000 | Klaricic ....................... 74/325 |
| 6,668,670 B1 | | 12/2003 | Führer et al. |

FOREIGN PATENT DOCUMENTS

| | | |
|---|---|---|
| AT | 208230 | 3/1960 |
| AT | 372 046 | 8/1983 |
| DE | 900 058 | 12/1953 |
| DE | 1 022 916 | 1/1958 |
| DE | 1 119 678 | 12/1961 |
| DE | 1 580 101 | 10/1970 |
| DE | 199 54 130 A1 | 5/2001 |
| EP | 1 172 246 A2 | 1/2002 |
| FR | 1.358.208 | 6/1962 |
| GB | 405200 | 2/1934 |
| JP | 1-137228 | 5/1989 |

OTHER PUBLICATIONS

"ECOSPLIT and ASTRONIC models", pp. 4.

* cited by examiner

INTERMEDIATE GEAR SYSTEM FOR THE REVERSE GEAR OF A GEARBOX WITH POWER TAKE-OFF

This application is a national stage completion of PCT/EP2003/008274 filed Jul. 26, 2003 which claims priority from German Application Serial No. 102 35 535.5 filed Aug. 3, 2002.

FIELD OF THE INVENTION

The present invention concerns an arrangement of the intermediate gear for the reverse gear in connection with a transmission with coaxial drive shaft and output shaft, especially a discrete ratio transmission, and with at least one additional intermediate shaft for a power take-off.

BACKGROUND OF THE INVENTION

Usually one or more reverse gears are realized with a so-called reverse gear intermediate wheel for reversal of rotation in connection with discrete ratio transmissions for motor vehicles with coaxial drive and output shaft, as this is described in the framework of DE 199 54 130 A1 of the Applicant. This intermediate gear for the reverse gear is freely pivoted on a defined position in the transmission housing and, as a rule, meshes with a running gear on the countershaft or driving shaft and a running gear on the main shaft or driven shaft.

Alternatively, the intermediate gear for the reverse gear can also engage into a gearing of the drive shaft and a gearing of the countershaft as driven shaft.

All transmissions known today have a position for the intermediate gear for the reverse gear which is supposed to keep the bearing reaction forces on the transmission housing as low as possible in reverse gear traction operation and which, as a rule, has the greater bearing forces on the housing in reverse gear pushing operation (with low running times).

This position for the intermediate gear for the reverse gear is defined as follows according to the state of the art.

If one extends an imaginary plane that passes through the axes of rotation of the driving and the output shafts and orients this plane horizontally so that the driving shaft is located to the right of the output shaft in the direction of travel, then the preferred position for the intermediate gear for the reverse gear is always situated beneath this plane.

In certain motor vehicle segments, according to the prior art, the drive of power take-offs takes place through an additional intermediate shaft, which engages into the intermediate gear for the reverse gear. An example of a transmission constructed in this manner is the transmission model ECOMID by the Applicant, as it is known from Looman, Gear Transmissions, 3$^{rd}$ Edition, Springer Publishing Company, page 263.

A disadvantage of the position described for the intermediate gear for the reverse gear is that, this way, very large bearing reaction forces upon the transmission housing result if the power take-off is being driven. These high bearing reaction forces restrict the maximally allowable torque and the life expectancy for the power take-off operation. A functional disadvantage in relation to transmissions in which the power take-off is driven directly coaxially by the countershaft, as is the case in the models ECOSPLIT and ASTRONIC of the Applicant. In this context, it should be pointed out that the required life for the power take-off operation is many times higher than the life required for the reverse gear operation.

The direct drive of the power take-off, co-axially via the countershaft, is nonetheless only possible in many cases, for example with range-change transmissions with a rear-mounted range-change unit in planetary construction, if the center distance between main shaft and countershaft is sufficiently large. A sufficiently large center distance, in turn, results in correspondingly large and difficult-to-build transmissions with correspondingly high production costs.

The present invention is based upon the object of providing an arrangement of the intermediate gear for the reverse gear in connection with a discrete ratio transmission with co-axial drive and output shafts and at least one additional intermediate shaft for a power take-off that optimizes the life of the power take-off. In particular, large bearing reaction forces on the transmission housing, when the power take-off is being driven, are to be avoided.

Moreover, the maximally allowable torque in the power take-off operation is to be increased.

SUMMARY OF THE INVENTION

Wherefore, it is proposed that the intermediate gear for the reverse gear is arranged above an imaginary plane extended through the axes of the driving shaft and the output shaft, whereby with an imaginary horizontal orientation of the plane, the driving shaft is to the right of the output shaft in the direction of travel.

Significantly lower bearing reaction forces are transmitted to the transmission housing through the arrangement in accordance with the invention of the intermediate gear for the reverse gear during the power take-off operation so that the life of the power take-off operation is significantly increased. Moreover, higher torques are transmitted in power take-off operation.

Furthermore, compact and cost-optimized basic transmissions with a short center distance and low weight can be realized, which enable a power take-off operation with high torques to be transmitted and greater life.

BRIEF DESCRIPTION OF THE DRAWINGS

The invention will now be described, by way of example, with reference to the accompanying drawings in which.

DETAILED DESCRIPTION OF THE INVENTION

Figure 1:
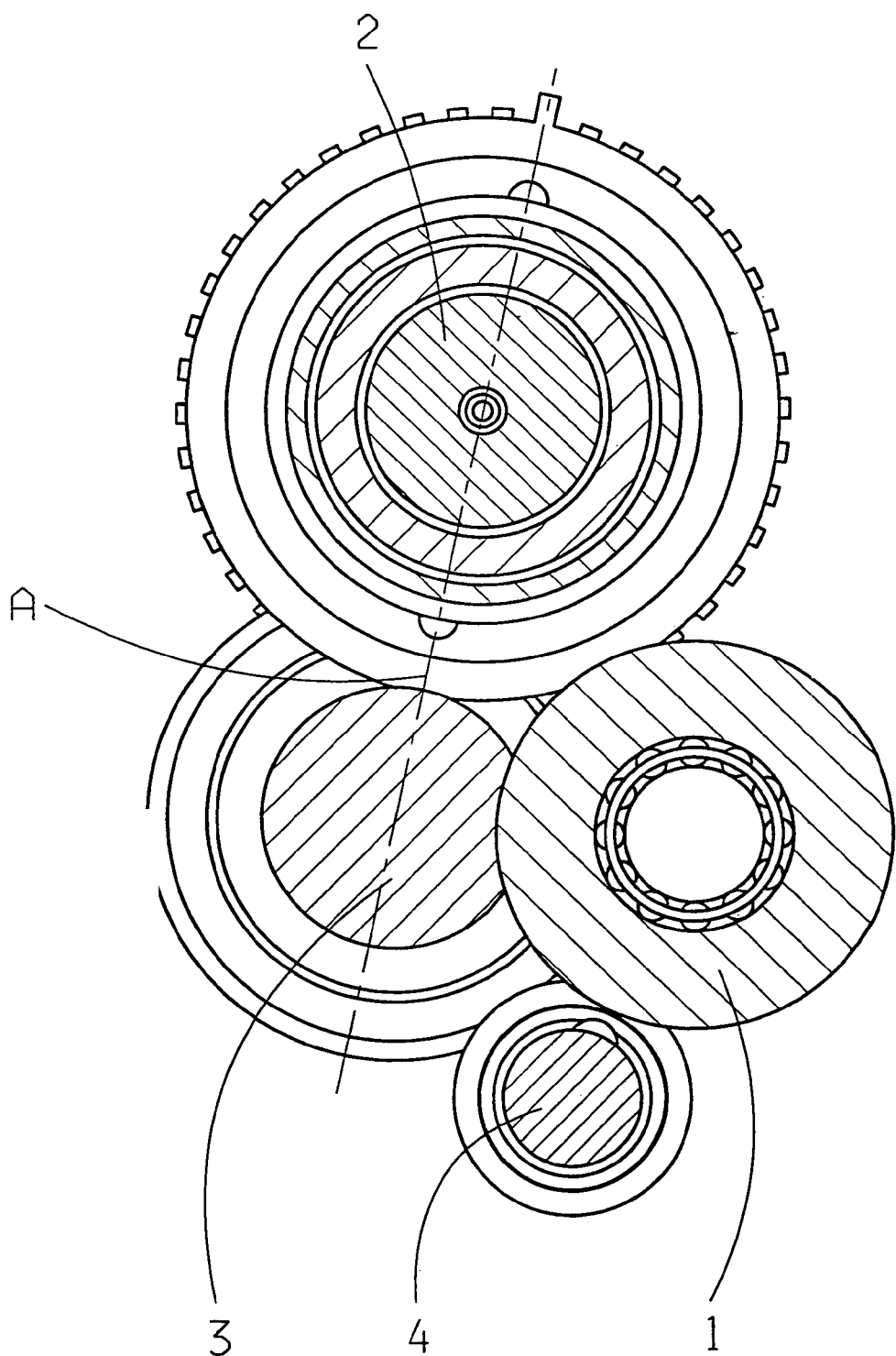
FIG. 1 schematically represents a sectional view of a preferred embodiment of an arrangement in accordance with the present invention.

FIG. 1 illustrates a sectional view of the arrangement of the intermediate gear for the reverse gear in a basic transmission with coaxial drive and output shafts and with at least one additional intermediate gear for a power take-off in accordance with the invention. It shows a main shaft 2 driven by an intermediate gear for a reverse gear 1 as well as a countershaft 3, which drives the intermediate gear 1. An intermediate gear 4 for the power take-off engages with the reverse intermediate gear 1. The drive shaft is not represented since it cannot be represented in the framework of this sectional view in the direction of travel due to its coaxial arrangement in relation to the main shaft 2, which serves as an output shaft of the basic transmission.

The intermediate gear for the reverse gear 1 is arranged in accordance with the invention above an imaginary plane A, which is extended through the axes of rotation of the driving shaft 3 and the output shaft 2. Moreover the plane A is to be horizontally oriented and the driving shaft 3 is located to the right of the output shaft 2 in the direction of travel.

The life of the power take-off operation is significantly increased through the design of the invention at high transmittable torques. Moreover compact and economical transmissions or basic transmissions are realized. It is also possible to transfer the arrangement of the intermediate gear for the reverse gear presented here for transmissions with drive and output shafts that are arranged parallel to the axis.

REFERENCE NUMERALS

1 Intermediate gear for the reverse gear
2 Driven shaft
3 Driving shaft
4 Intermediate shaft for the power take-off
A Imaginary plane

The invention claimed is:

1. An arrangement of an intermediate gear for a reverse gear (1) in connection with a transmission with a drive shaft and an output shaft (2) which are coaxial and with at least one intermediate shaft (4) arranged parallel to the drive and output shafts (2) for a power take-off, the intermediate shaft (4) is driven by the intermediate gear for the reverse gear, and the intermediate gear for the reverse gear (1) is driven by a driving shaft (3), which also drives the output shaft (2), the intermediate gear for the reverse gear (1) is arranged above an imaginary plane (A) extending through axes of the driving shaft (3) and the output shaft (2), the driving shaft (3) is located to the right of the output shaft (2) in a direction of travel with an imaginary horizontal orientation of the plane (A).

2. The arrangement of the intermediate gear for the reverse gear (1) according to claim 1, wherein the driving shaft (3) driving the intermediate gear for the reverse gear (1) is a countershaft.

* * * * *